US005207212A

United States Patent [19]

Woollen, Jr.

[11] Patent Number: 5,207,212

[45] Date of Patent: May 4, 1993

[54] SUBMERSIBLE HIGH-EFFICIENCY COMBUSTION CHAMBER FOR A WATER HEATER

[76] Inventor: Donald E. Woollen, Jr., 11610 104th La., North, Largo, Fla. 34643

[21] Appl. No.: 785,004

[22] Filed: Oct. 30, 1991

[51] Int. Cl.[5] .............................................. A47J 27/00

[52] U.S. Cl. ................................ 126/391; 126/360 R; 122/136 R

[58] Field of Search .................... 126/360 R, 369, 391, 126/389; 122/13 R, 19, 136 R; 165/157, 182, 183

[56] References Cited

U.S. PATENT DOCUMENTS 2,527,430 10/1950 Kniveton ........................ 126/391 X
2,642,858 6/1953 Plesset et al. ................... 126/116 R
3,349,754 10/1967 Bock ............................... 126/360 R
3,757,745 9/1973 Miller ......................... 126/360 R X
4,781,112 1/1991 Adams et al. .............. 126/360 R X

*Primary Examiner*—Larry Jones
*Attorney, Agent, or Firm*—Kenyon & Kenyon

[57] ABSTRACT

An apparatus for heating water in a water tank includes a first tubular member and a second tubular member that has an input end and an exhaust end. The second tubular member is disposed at least in part within the first tubular member to form an annular clearance space therebetween. A burner is coupled to the input end of the second tubular member and supplies gases produced by combustion to the interior of the second tubular member.

7 Claims, 4 Drawing Sheets

SUBMERSIBLE HIGH-EFFICIENCY COMBUSTION CHAMBER FOR A WATER HEATER

BACKGROUND OF THE INVENTION

This invention relates generally to water heaters for heating potable water and more particularly to a water heater that does not require a series of heat exchanger tubes.

In known water heaters such as described in U.S. Pat. Nos. 4,651,714 and 4,875,465, a tubular member serving as a combustion chamber is mounted in an opening in the side of a water tank and extends horizontally across the lower portion of the tank. An elongated burner is positioned within the combustion chamber. The waste gases of combustion generated by igniting a fuel-air mixture are discharged from the inner end of the tubular member and are directed into a series of heat exchanger tubes, which are positioned beneath the combustion chamber. The outer ends of the heat exchanger tubes extend through the wall of the tank and communicate with a flue collector through which the waste gases can be discharged.

Because the above-mentioned water heaters require a relatively large number of components, and further because of the particular type of construction such systems require, these water heaters are vulnerable to failure in several different ways. For example, the narrow heat exchanger tubes may fail as a result of corrosion through exposure to water in the tank, exposure to combustion gases in the tubes themselves, or through simple metal fatigue. Tube joints may also fail where the tubes are attached to the tube sheet. Thus, even a small water heater that has only a few heat exchanger tubes may fail in one of a multiple of different ways.

When such failures do occur they are difficult to correct. The process of replacing a heat exchanger tube is costly and time consuming, requiring that the heater be shut down and drained so that the entire chamber can be removed. An alternative procedure requires that the defective heat exchanger tube be sealed off so that the waste gases do not flow therethrough. However, this alternative method is not satisfactory because it increases the time required by the water heater to heat the water and, additionally, it is often a violation of local boiler codes. Furthermore, only a small number of heat exchanger tubes in any given water heater may be sealed off before the heater fails to operate properly.

An additional problem with these known water heaters is that it is expensive and time consuming to construct the heat exchanger tubes and mount them individually in the chamber. Furthermore, as the input power of the water heater increases, the number of heat exchanger tubes that are required increases and hence the time and expense also increases.

SUMMARY OF THE INVENTION

The present invention provides an apparatus for heating water in a water tank that includes a first tubular member and a second tubular member that has an input end and an exhaust end. The second tubular member is disposed at least in part within the first tubular member to form an annular clearance space therebetween. A burner is coupled to the input end of the second tubular member and supplies gases produced by combustion to the interior of the second tubular member.

In one embodiment of the invention, the combustion gases are conveyed through the interior of the second tubular member and discharged through its exhaust end. The hot gases then impinge upon a sealed back end of the first tubular member so that heat is transferred through the first tubular member to the water in the tank. After being deflected by the back end of the first tubular member, the exhaust gases are conducted through the annular clearance space, transferring additional heat through the first tubular member to the water in the tank.

One advantage provided by the present invention is that only one surface is exposed to the water and only one surface is exposed to the combustion gases. Thus, the number of sites at which failures are likely to occur is minimized. In contrast, the above-mentioned known water heaters require as many surfaces exposed to the water and the combustion gases as there are heat exchanger tubes.

Another advantage provided by the present invention is the simplicity by which repairs can be performed in the event a failure does occur. The second tubular member can be easily removed to gain access to the first tubular member. Repairs may then be made inside the first tubular member without the need for removing the entire heating unit from the tank. Moreover, a large number of repairs can be performed without affecting either the time required by the water heater to heat the water or its venting capacity.

Because the present invention does not utilize heat exchanger tubes, the number of individual components required is kept to a minimum, considerably lowering construction and material costs. Furthermore, the number of required components does not increase with an increase in the BTU input of the burner, as it would with the above-mentioned known water heaters. Rather, in the present invention, the tubular members are simply enlarged in accordance with the power requirements.

DETAILED DESCRIPTION

Figure 1:
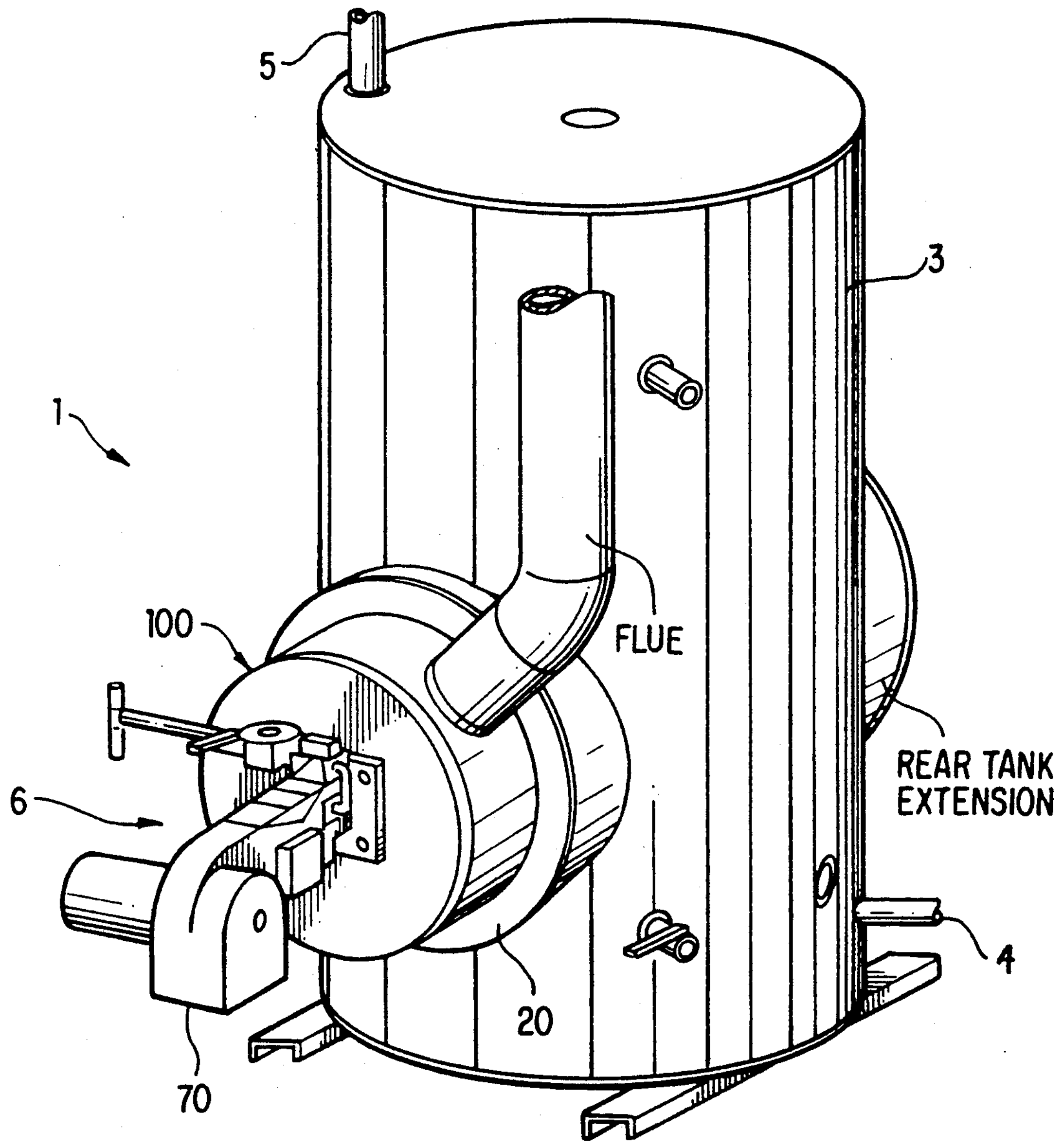
FIG. 1 is a perspective view of a Water heater that incorporates the heating unit constructed according to the principles of the invention.

FIG. 1 shows a water heater indicated generally by reference numeral 1 that includes a water tank 3. Cold water is introduced into the tank 3 through an inlet 4 while the heated water is withdrawn from tank 3 through an outlet 5.

In accordance with the invention, water in the tank 3 is heated by a heating unit indicated generally by 6, which is mounted in a sidewall of the tank 3 so that it extends through the cross-section thereof.

Figure 2:
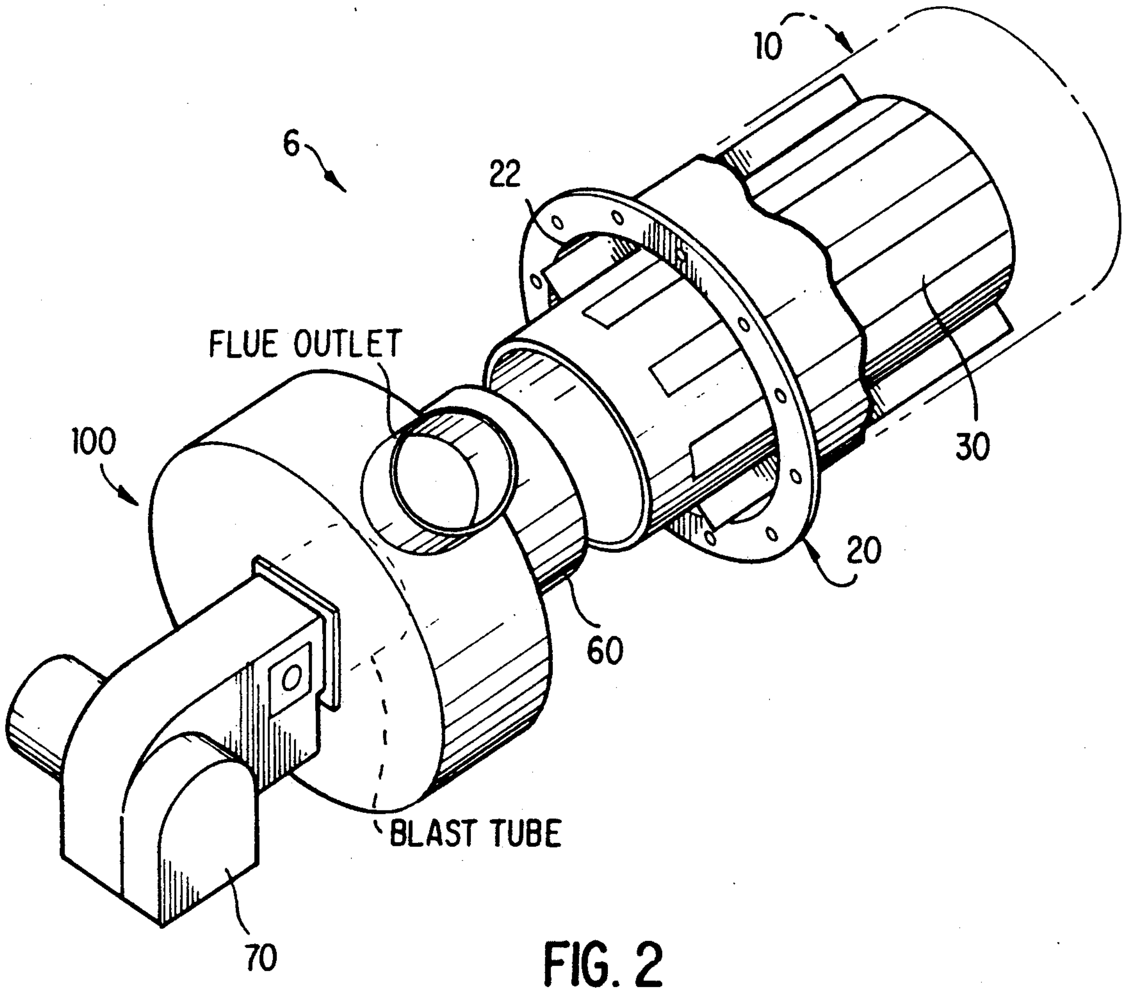
FIG. 2 is a perspective view of the heating unit shown in FIG. 1 with the inner chamber partially retracted from its position within the outer shell.

FIG. 2 shows an exploded view of the heating unit 6. An outer shell 10 having a generally cylindrical shape is inserted directly into the tank 3 and forms the component of the heating unit 6 that directly contacts the water to be heated. The front end of the outer shell 10 has a mounting flange 20 that mates with a corresponding flange in the sidewall of the tank 3. An O-ring or gasket is inserted between the two flanges to form a seal therebetween. Bolts are inserted through the mounting flange 20 to secure the outer shell 10 to the tank 3.

The front end of the outer shell 10 on which the mounting flange 20 is disposed is unsealed to allow the inner chamber 30 to be inserted within the outer shell 10. The back end of the outer shell 10 remote from the mounting flange 20 is sealed. This closed end serves as the primary surface through which heat is exchanged between the heating unit 6 and the water. In one embodiment of the invention, the closed end of the outer shell 10 is planar. In an alternative embodiment of the invention, the closed end of the outer shell 10 is dome-shaped with the closed end curving outward. An outer shell 10 having a dome-shaped closed end is particularly advantageous when the heating unit 6 is to be installed in a large-capacity tank 3 since it will better withstand the increased static pressure exerted on the exterior surfaces of outer shell 10 than would a planar-shaped closed end. To prevent the outer shell 10 from being corroded by the water in the tank 3, the exterior surfaces of the shell 10 may be clad in any suitable coating such as a thin sheet of copper. Alternatively, it may be coated with Ceramite "Glassguard". "Glassguard" is a trademark of England Hughes Bell & Co. Ltd. of Manchester, England.

Figure 4:
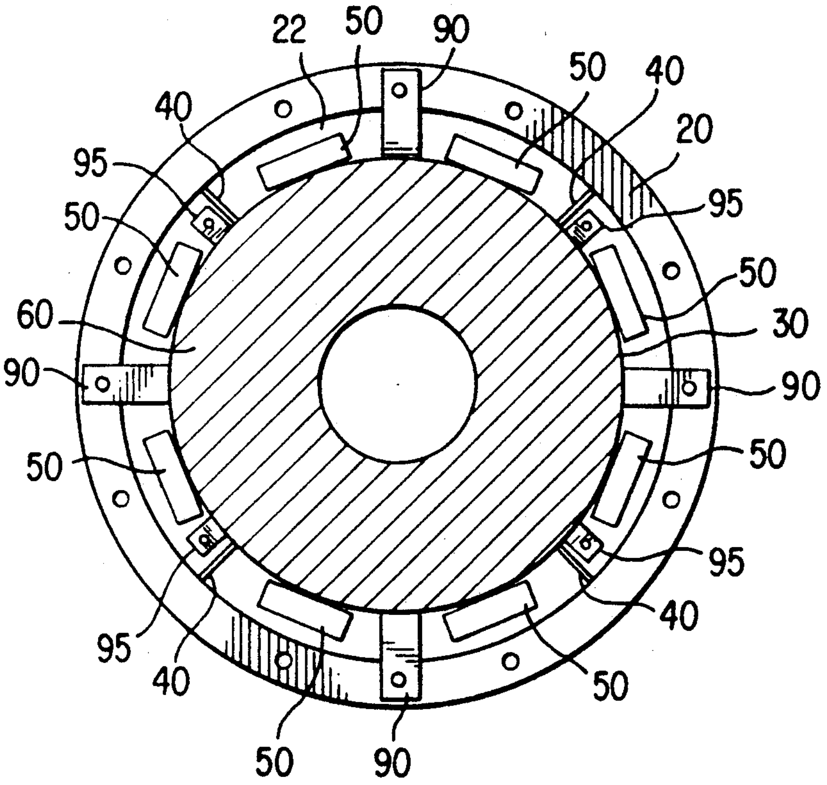
FIG. 4 is a plan view of the input end of the inner chamber shown in FIG. 3 mounted in the outer shell.

As seen in FIGS. 2 and 4, the hollow cylindrical inner chamber 30, which serves as a combustion chamber, is inserted into the outer shell 10 to form an annular clearance space 22 therebetween. The inner chamber 30 is open at both ends. The front end of the inner chamber 30 serves as the input end for the exhaust gases emitted by the burner 70. After traversing the interior of the inner chamber 30, the exhaust gases are expelled from the back or exhaust end of the inner chamber 30. The inner surface of the inner chamber 30 is lined with a refractory material that has a thickness sufficient to prevent the chamber wall from being exposed directly to the heat, which could result in metal fatigue.

Figure 3:
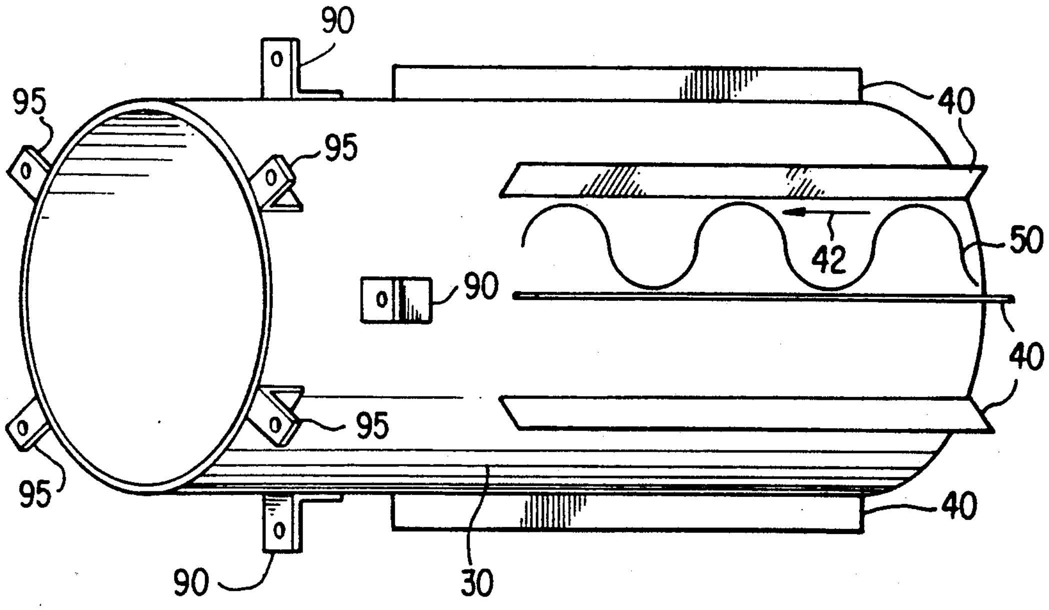
FIG. 3 is a perspective view of the inner chamber utilized in the heating unit of FIG. 1.

As FIGS. 3 and 4 illustrate, fins 40 are disposed circumferentially about the exterior surface of the inner chamber 30. The fins 40 each have a height extending in the radial direction with respect to the longitudinal axis of the inner chamber 30 and they each have a length extending in the longitudinal direction. The fins 40 support the inner chamber 30 within the outer shell 10.

Flue baffles 50 are also positioned circumferentially about the exterior surface of the inner chamber 30 and extend between adjacent pairs of fins 40. The baffles 50 do not contact the fins 40, but are spaced apart to form a passageway through which exhaust gases may be conducted. The height of the baffles 50 in the radial direction is less than the height of the fins 40 and thus the baffles do not contact the outer shell 10. The baffles 50 are not necessarily fixed to the inner chamber 30, but may be advantageously designed to slide in and out of the annular clearance space 22 so that they may be replaced without removing either the inner chamber 30 or the outer shell 10. The regions of the clearance space 22 between the baffles 50 and the fins 40, as well as the regions between the baffles 50 and interior wall of the outer shell 10, form an axially extending passageway along which the exhaust gas is conducted after the gas has exited the exhaust end of the inner chamber 30 and has been deflected by the closed back end of the outer shell 10. In FIG. 3, arrow 42 indicates the direction of motion of the exhaust gases along the passageway.

The baffles 50 increase the turbulence of the exhaust gases flowing along the passageway of the clearance space 22, thereby increasing the rate of heat transfer between the outer shell 10 and the water. In FIG. 3 the baffles 50 are shown as having a sinusoidal configuration. However, the baffles 50 more generally may have any shape that increases the turbulence of the gases, including a configuration similar to a sawtooth wave. Furthermore, the baffles 50 may be eliminated in those cases where the heat transfer efficiency is not of primary concern. Similarly, the fins 40 do not necessarily have to be linear or extend in the longitudinal direction, as illustrated in FIG. 3, but may have any configuration that cooperates with the baffles 50 to create a turbulent path for the gases. The precise number, length, and position of the baffles 50 which yields the highest efficiency depends on the BTU input of the burner 70.

A spool-shaped sealing element 60 formed from a refractory material such as a ceramic is inserted into the input end of the inner chamber 30. The sealing element 60 has two parallel flanges coupled by a cylindrical tube through which the exhaust gases from the burner are conveyed to the inner chamber 30. The blast tube of the burner 70 is inserted into the tube of the sealing element 60. The sealing element 60 prevents the combustion gases from backflowing out of the inner chamber 30 into the burner 70.

The burner 70 may comprise any burner having a forced-air design that has a power rating appropriate for the size of the heating unit 6. The burner 70 ignites the mixture of air and fuel (e.g., oil, liquid propane gas, or natural gas). A blower in the burner 70 delivers the gases resulting from the combustion of the air and fuel mixture to the interior of the inner chamber 30 via the sealing element 60. The combustion gases are forced through the inner chamber 30 and discharged from its exhaust end remote from the burner 70. The exhaust gases are then deflected by the closed end of the outer shell 10. As the hot gas impinges on the back end of the outer shell 10, heat is transferred through the outer shell 10 to the water in the tank 3. After being deflected, the exhaust gases are forced into the clearance space 22 between the outer shell 10 and the inner chamber 30 where they are conducted along the axially extending passageway between the fins 40 and the baffles 50. If the closed end of the outer shell 10 is dome-shaped rather than planar, the exhaust gases will be more smoothly directed into the clearance space 22. While the gases traverse the passageway additional heat is transferred between the exhaust gases and the water. As the exhaust gases exit the passageway at the input end of the inner chamber 30 they are collected by a flue collector 100 and expelled to the atmosphere through an appropriate venting system.

As shown in FIG. 3, brackets 90 are circumferentially disposed on the exterior surface of the input end of the inner chamber 30 to secure the inner chamber 30 to the outer shell 10. When the inner chamber 30 is properly positioned in the outer shell 10, the inner chamber 30 extends axially beyond the mounting flange 20 of the outer shell 10. The fins 40 and the baffles 50 do not extend in the longitudinal direction the full length of the inner chamber 30. Rather, the fins 40 and baffles 50 have a length that is no greater than the length of the outer shell 10. Furthermore, the fins 40 and the baffles 50 are positioned on the inner chamber 30 in such a way that they are fully contained within the outer shell 10 when the inner chamber 30 is properly positioned within the outer shell 10.

The flue collector 100 encloses the exposed portion of the inner chamber 30 that is not contained within the outer shell 10 and forms a seal with the mounting flange 20. The flue collector 100 is secured to the inner chamber 30 by brackets 95 that are circumferentially disposed on the outer surface of the inner chamber 30. The brackets 95 are located closer to the input end of the inner chamber 30 than are the brackets 90.

In one embodiment of the invention, the shell 10 is formed from cold-rolled steel $\frac{1}{8}$ of an inch thick with an inner diameter of approximately 23 inches. The flange 20 is fabricated from $\frac{1}{2}$ inch-thick steel plate and welded to the open end of the outside shell 10. Alternatively, the outer shell 10 can be constructed from copper or some other high thermal conductivity material. The inner chamber 30 has a diameter of approximately 20 inches and the exterior of the inner chamber 30 is fitted with fins 40 approximately $\frac{3}{4}$ inches high.

In can be seen from the above description of the invention that the number of components is reduced in comparison to the known water heaters discussed above. Consequently, the production costs are decreased as are the number of potential component failures. Furthermore, the elimination of heat exchanger tubes eliminates a very likely source of failure in the heating unit 6.

Finally, by providing an inner chamber 30 within an outer shell 10, installation and service of the heating unit 6 is simplified. Installation is simplified because the outer shell 10 can be installed in the water tank 3 independently of the inner chamber 30. Likewise, the inner chamber 30 can be removed without removing the outer shell 10 from the water tank 3 so that any leaks that occur in the outer shell 10 can be easily repaired and so that both the outer shell 10 and inner chamber 30 can be easily cleaned.

What is claimed is:

1. An apparatus for heating water in a water tank comprising:

a first tubular member having a closed back end;

a second tubular member having a longitudinal axis, an input end and an exhaust end, said second tubular member disposed and supported at least in part within said first tubular member to form an annular clearance space therebetween, said exhaust end spaced apart from said closed end of said first tubular member;

a plurality of longitudinally extending fins supporting said second tubular member within said first tubular member, said fins disposed circumferentially about the exterior surface of the second tubular member, said fins each having a length substantially parallel to the longitudinal axis;

a plurality of baffles for turbulating combustion gases, each of said baffles being slidably positioned between a pair of adjacent fins and spaced therefrom, said baffles defining with said fins and the interior surface of the first tubular member a series of axially extending passageways that can be traversed by the combustion gases, and wherein said baffles are not permanently attached to said first tubular member;

a burner coupled to the input end of the second tubular member for supplying the combustion gases to the interior of the second tubular member; and means for collecting the combustion gases after the combustion gases traverse said annular clearance space.

2. The apparatus of claim 1 wherein said closed back end of said first tubular member has a curvature that is concave relative to a region interior to said first tubular member.

3. The apparatus of claim 2 wherein said second tubular member has an inner surface lined with a refractory material.

4. The apparatus of claim 1 wherein said second tubular member has an inner surface lined with a refractory material.

5. The apparatus of claim 1 wherein said second tubular member has an inner surface lined with a refractory material.

6. An apparatus for heating water in a water tank comprising:

a first tubular member having a closed back end;

a second tubular member having a longitudinal axis, an input end and an exhaust end, said second tubular member disposed and supported at least in part within said first tubular member to form an annular clearance space therebetween, said exhaust end spaced apart from said closed end of said first tubular member;

a plurality of longitudinally extending fins supporting said second tubular member within said first tubular member, said fins disposed circumferentially about the exterior surface of the second tubular member, said fins each having a length substantially parallel to the longitudinal axis;

a plurality of baffles for turbulating combustion gases, each of said baffles being slidably positioned between a pair of adjacent fins and spaced therefrom such that said baffles are replaceable without removing the first tubular member from the water tank, said baffles defining with said fins and the interior surface of the first tubular member a series of axially extending passageways that can be traversed by the combustion gases;

a burner coupled to the input end of the second tubular member for supplying the combustion gases to the interior of the second tubular member; and means for collecting the combustion gases after the combustion gases traverse said annular clearance space.

7. The apparatus of claim 6 wherein said closed back end of said first tubular member has a curvature that is concave relative to a region interior to said first tubular member.

* * * * *

UNITED STATES PATENT AND TRADEMARK OFFICE

CERTIFICATE OF CORRECTION

PATENT NO. : 5,207,212

DATED : May 4, 1993

INVENTOR(S) : Donald E. Woollen, Jr.

It is certified that error appears in the above-indentified patent and that said Letters Patent is hereby corrected as shown below:

| Column | Line | |
|---|---|---|
| 2 | 41 | Change "Water" to --water--. |
| 6 | 21 | Change "claim 1" to --claim 5--. |

Signed and Sealed this

Twenty-second Day of February, 1994

Attest:

BRUCE LEHMAN

*Attesting Officer* *Commissioner of Patents and Trademarks*